United States Patent
Yousefian et al.

(10) Patent No.: US 10,549,692 B2
(45) Date of Patent: Feb. 4, 2020

(54) VEHICLE SURROUNDINGS MONITORING APPARATUS

(71) Applicants: AISIN TECHNICAL CENTER OF AMERICA, INC., Northville, MI (US); AISIN SEIKI KABUSHIKI KAISHA, Kariya-shi (JP)

(72) Inventors: Reza Yousefian, Plymouth, MI (US); Junya Kasugai, Plymouth, MI (US); Haruki Sakakibara, Novi, MI (US); Kazuya Watanabe, Anjo (JP); Tetsuya Maruoka, Okazaki (JP)

(73) Assignees: AISIN TECHNICAL CENTER OF AMERICA, INC., Northville, MI (US); AISIN SEIKI KABUSHIKI KAISHA, Kariya-shi (JP)

(*) Notice: Subject to any disclaimer, the term of this patent is extended or adjusted under 35 U.S.C. 154(b) by 53 days.

(21) Appl. No.: 15/662,413

(22) Filed: Jul. 28, 2017

(65) Prior Publication Data

US 2019/0031101 A1 Jan. 31, 2019

(51) Int. Cl.
*G06T 11/60* (2006.01)
*B60R 1/00* (2006.01)

(52) U.S. Cl.
CPC ............... *B60R 1/00* (2013.01); *G06T 11/60* (2013.01); *B60R 2300/105* (2013.01); *B60R 2300/301* (2013.01); *B60R 2300/302* (2013.01); *B60R 2300/303* (2013.01); *B60R 2300/305* (2013.01); *B60R 2300/607* (2013.01); *B60R 2300/8086* (2013.01)

(58) Field of Classification Search
CPC ............. B60R 1/00; B60R 2300/8086; B60R 2300/607; B60R 2300/303; B60R 2300/302; B60R 2300/105; B60R 2300/301; G06T 11/60
See application file for complete search history.

(56) References Cited

U.S. PATENT DOCUMENTS

| | | | |
|---|---|---|---|
| 8,977,446 B2 | 3/2015 | Kuboyama et al. | |
| 2005/0165550 A1* | 7/2005 | Okada | G06K 9/00805 701/301 |
| 2007/0245578 A1* | 10/2007 | Clark | G01C 9/00 33/365 |
| 2011/0141281 A1 | 6/2011 | Barefoot et al. | |
| 2014/0232851 A1 | 8/2014 | Hough et al. | |
| 2015/0169205 A1* | 6/2015 | Yajima | G06F 3/0481 715/799 |
| 2015/0203035 A1 | 7/2015 | Watanabe | |
| 2017/0372174 A1* | 12/2017 | Wshah | G06K 9/6256 |

\* cited by examiner

*Primary Examiner* — Tapas Mazumder
(74) *Attorney, Agent, or Firm* — Oblon, McClelland, Maier & Neustadt, L.L.P.

(57) ABSTRACT

A driver assist system and method for a motor vehicle that includes processing circuitry configured to receive and store a sequence of images from perimeter view cameras, select at least a portion of a previously stored image based on an estimated position displacement of the motor vehicle, construct an under view image of at least a portion of the motor vehicle, and display the under view image on a display monitor.

18 Claims, 14 Drawing Sheets

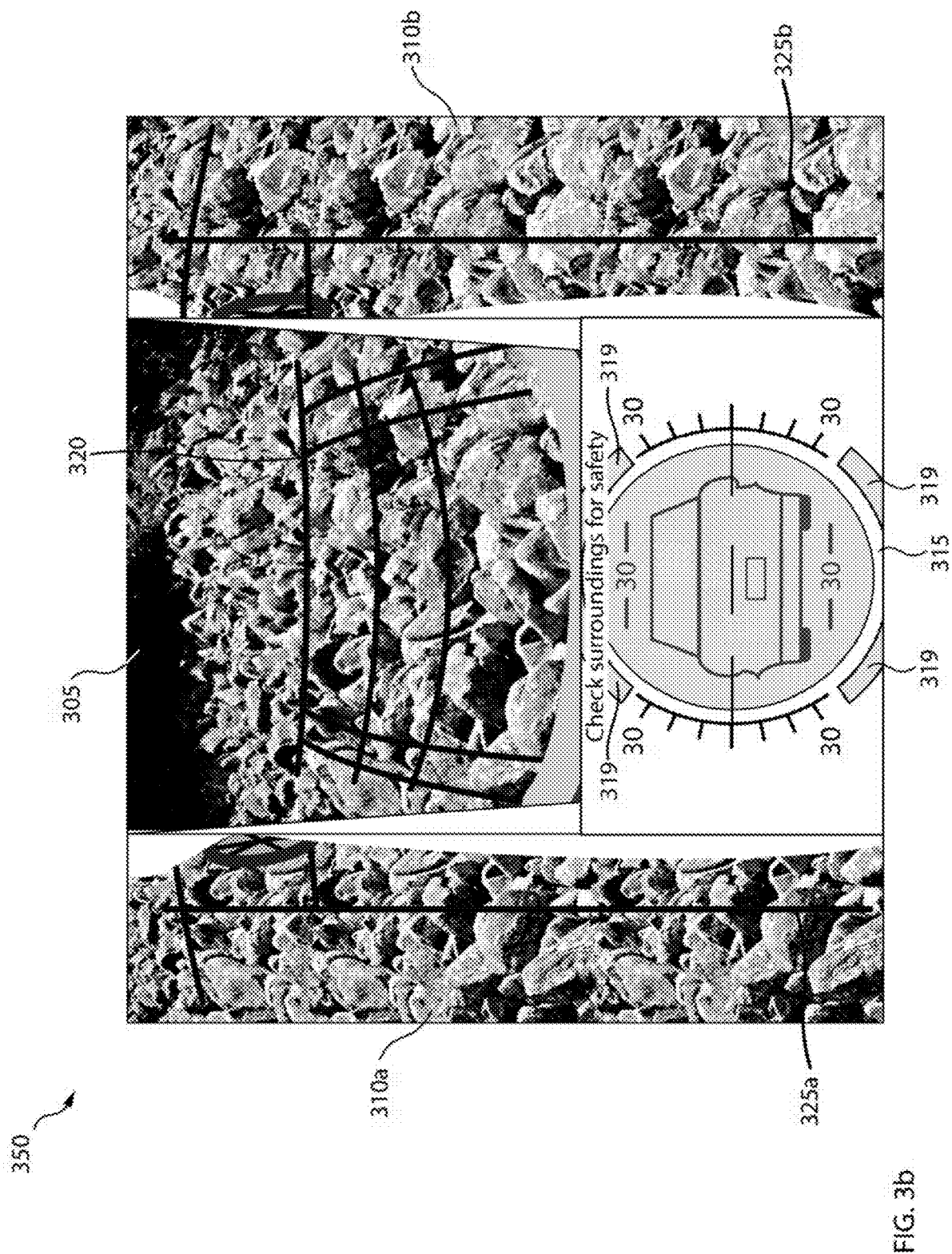

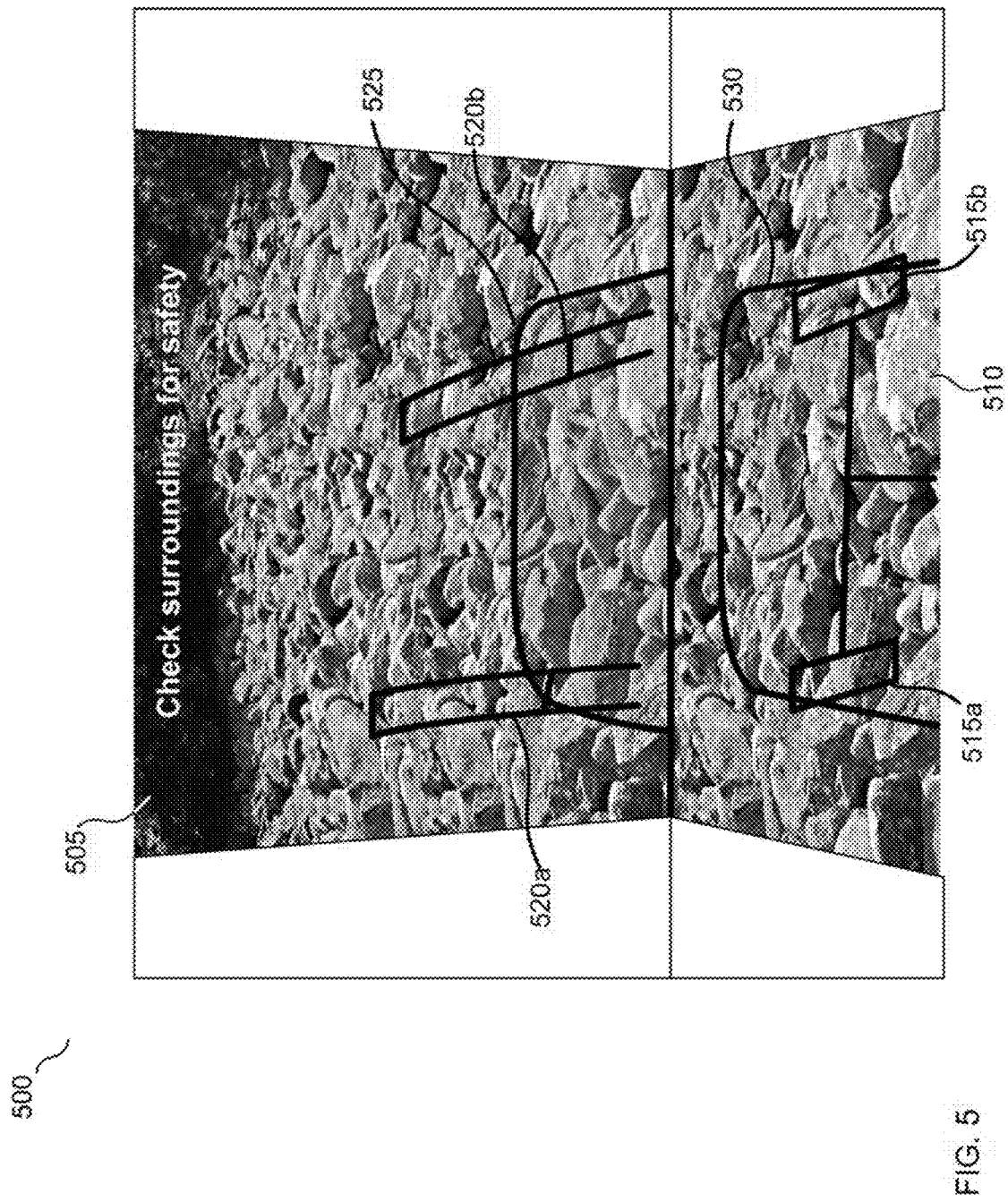

FIG. 10

VEHICLE SURROUNDINGS MONITORING APPARATUS

BACKGROUND

Technical Field

The present disclosure relates to a driver assist system for use in a motor vehicle. More specifically, a vehicle surroundings monitoring apparatus assists a driver by displaying information relating to the ground and terrain around and under a motor vehicle on a display mounted in a vehicle.

Description of the Related Art

Various forms of motor vehicle driver assist systems have been introduced in recent years. UPS-based navigation systems, backup cameras, and perimeter view cameras help drivers find their way to a destination, avoid backing into obstacles, and help them park.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

A driver assist system for a motor vehicle includes a processing circuitry, one or more perimeter view cameras, a means for sensing a position displacement of the motor vehicle, an interactive display monitor. The processing circuitry is configured to receive and store a sequence of images from each of the perimeter view cameras, estimate a position displacement of the motor vehicle based on an output of the means for sensing a position displacement, select at least a portion of a previously stored image from the sequence of images from each of the perimeter view cameras based on the estimated position displacement of the motor vehicle to construct an under view image of at least a portion of the motor vehicle, and display the under view image in a pane on the interactive display monitor.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3b is an another example of a display image of a driver assist system showing front view, full side views and meter;

FIG. 5 is yet another example of a display image of a driver assist system showing front view and partial under view;

FIG. 10 illustrates an additional example of a display image of a driver assist system showing front view with partial under view, 360° perimeter view, and meter;

DETAILED DESCRIPTION

Figure 1:
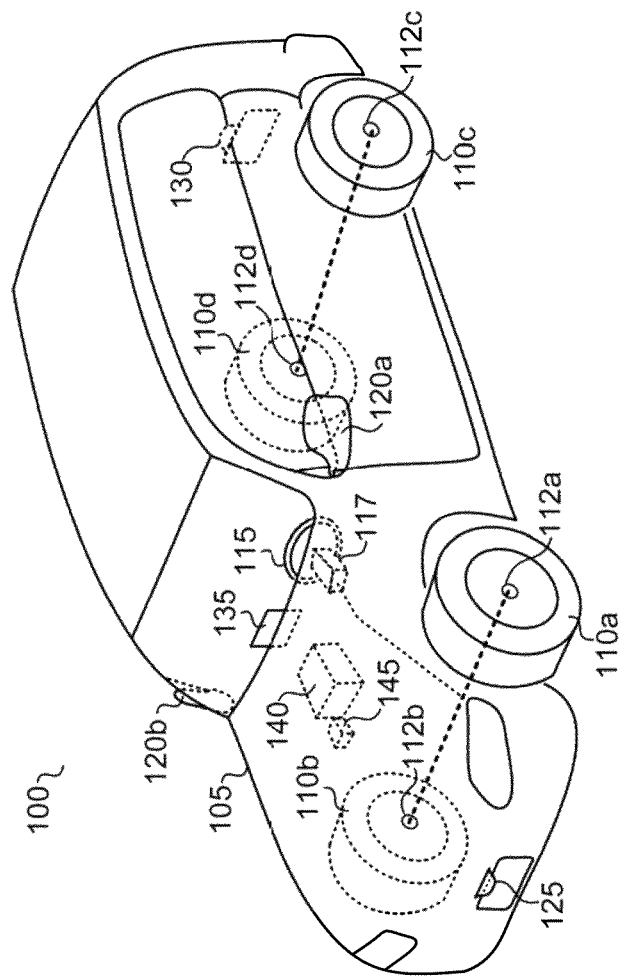
FIG. 1 illustrates a schematic diagram of a motor vehicle employing a driver assist system.

Driver assist systems for off-road driving, where drivers may encounter steep, slippery and rocky terrain, are particularly important for avoiding injury and vehicle damage. In off-road conditions, drivers need to know the orientation of the vehicle, the nature of the terrain, exactly where the wheels are situated, and where the wheels are heading to avoid potentially treacherous situations.

Referring now to the drawings, wherein like reference numerals designate identical or corresponding parts throughout the several views.

FIG. 1 illustrates a schematic diagram of a motor vehicle 100 employing a driver assist system. Motor vehicle 100 may include a body/frame 105, a plurality of wheels 110a-110d (four wheels are shown in FIG. 1, but implementations with fewer or more than four wheels are possible and well within the scope of the instant disclosure) with wheel rotation sensors 112a-112d (one on each wheel), a steering wheel 115, steering angle sensor 117, side view minors with side view cameras 120a and 120b, front view camera 125, rear view camera 130, interactive display monitor 135, and on-board computer 140. It should be noted that each of the perimeter view cameras (for example, front view camera 125, side view cameras 120a and 120b, and rear view camera 130) may be equipped with a wide-angle or fish-eye lens and may be directed toward the ground such that the ground and terrain immediately adjacent to the perimeter of the vehicle and extending outward at least 50 feet from the vehicle may be within the field of view of each perimeter view camera. Additional perimeter view cameras (front view, side view, and rear view), or perimeter view cameras in locations other than those indicated in FIG. 1, may be used to enhance visibility, coverage, and image quality. On-board computer 140 may include one or more processors, including one or more general purpose processors, and one or more graphics processors. On-board computer may also include pitch and roll angle sensors 145, or pitch and roll angle sensors 145 may be mounted on another part of motor vehicle 100 and electrically connected to on-board computer 140. Signals from the wheel rotation sensors 112a-112d, steering angle sensor 117, and from each of the cameras may also be electrically connected to on-board computer 140. It should be understood that the term "electrically connected" in the current context may include a wired, optical, wireless, or any other type of connection that serves to convey information from the corresponding sensor or camera.

Wheel rotation sensors 112a-112d may each produce a signal that indicates the angular velocity (rotational speed and direction) of the corresponding wheel 110a-110d. Wheel rotation sensors 112a-112d may be used to estimate vehicle velocity (using a known value of the tire outer circumference), and may also be used to detect wheel slippage (loss of traction on one or more wheels) by detecting differences in angular velocity between and among the wheels. Steering angle sensor 117 may produce a signal that corresponds to the steering angle of front wheels 110a and 110b. The steering angle, along with the angular velocity of wheels 110a-110d may be used to sense the motion (speed and direction) and position displacement of motor vehicle 100. Other methods may be used for sensing the motion and position displacement of motor vehicle 100. For example, GPS, Assisted GPS, Differential GPS, cellular network signals, ultrasonic sensors, optical or electro-magnetic sensors, analysis of perimeter view camera images, and the like may all be used individually, or in combination, to sense the motion and position displacement of motor vehicle 100. Motor vehicle 100 may be equipped with additional devices, such as ultrasonic, optical, or electro-magnetic distance/proximity sensors to detect distance from surrounding objects or other vehicles, and stroke length detectors to detect shock absorber/suspension extension. Each of these additional devices may be electrically connected to on-board computer 140 to allow it to assess additional hazards.

Interactive display monitor 135 may typically be mounted or projected on or near a dashboard of the vehicle within view and within reach of the driver of the motor vehicle. Interactive display monitor 135 may provide the driver of motor vehicle 100 with visual assistance as part of the driver assist system. Interactive display monitor 135 may include a display screen (LCD, OLED, CRT, Heads Up Display (HUD), or other display technology), touch screen (resistive, capacitive, optical, or other touch screen technology), buttons and other controls that may allow the driver to see various views of the area surrounding and under the vehicle, and may also allow the driver to select a display configuration (combination of different views and meters, for example) that provides maximum assistance for a given set of driving conditions. For example, interactive display monitor 135 may accept one or more inputs from the driver of the motor vehicle to select a specific set of views. In some embodiments, on-board computer 140 may automatically select an appropriate view for display on interactive display monitor 135 based on a detected set of driving conditions.

The driver assist system may use at least four cameras to create a 360° view of the periphery of motor vehicle 100. The images from the two side view cameras 120a and 120b, front view camera 125, and rear view camera 130 may be corrected, in on-board computer 140, for image distortion (from a wide-angle or fish-eye lens, for example) and then combined into an image mosaic, with the images from the cameras stitched together to form a complete view of the periphery of motor vehicle 100. As discussed above, additional perimeter view cameras may be used to enhance visibility, coverage, and image quality. The images from such additional cameras may also be corrected, in on-board computer 140, for image distortion and used to enhance the image mosaic.

Figure 2:
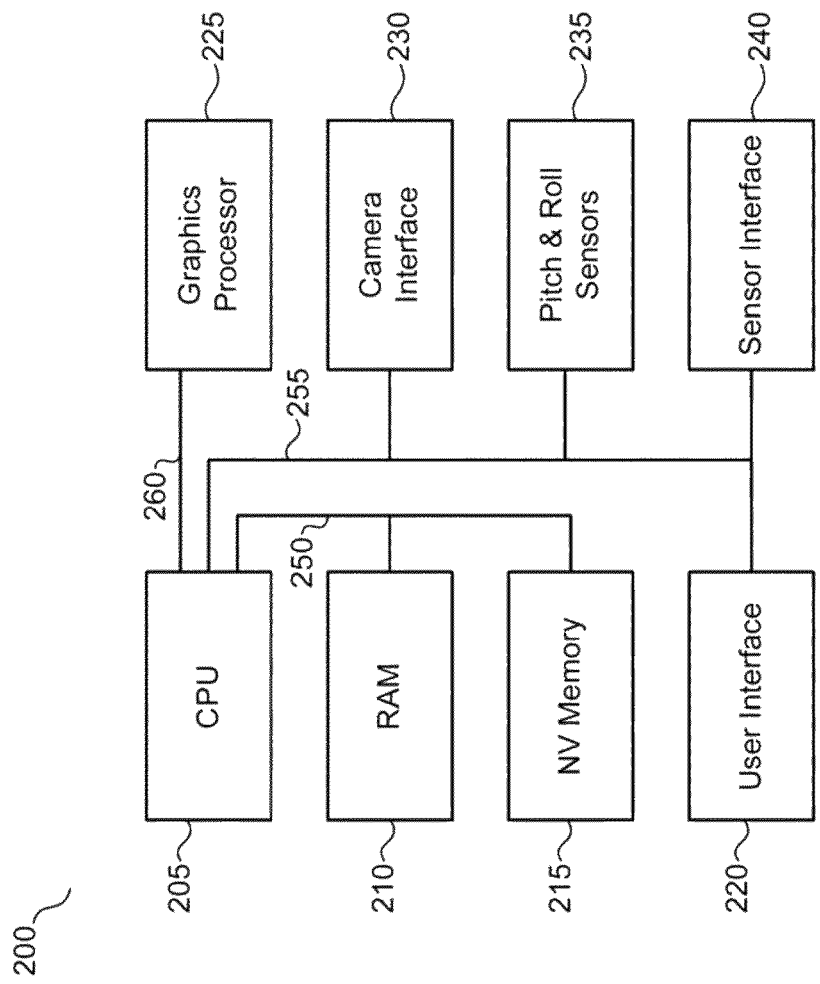
FIG. 2 illustrates a functional block diagram of a processing circuit for use in a driver assist system.

FIG. 2 illustrates a functional block diagram of example processing circuitry 200 that may be used in a driver assist system and that may be included as part of on-board computer 140. Processing circuitry 200 may include CPU 205, RAM 210, non-volatile memory 215, user interface 220, graphics processor 225, camera interface 230, pitch and roll angle sensors 235, and sensor interface 240. Processing circuitry 200 may also include a non-transitory computer-readable medium storing computer-readable instructions, which may be executed by processing circuitry 200 (or a computer located therein) to implement the features discussed herein.

One or more of the functional blocks illustrated in FIG. 2, along with additional circuitry, may be implemented on one or more integrated circuits. For example, CPU 205 may be a stand-alone integrated circuit microprocessor (computer), or may be embedded into a so-called "system on a chip" (SOC), along with RAM 210, graphics processor 225, and other components. Non-volatile memory 215 may be semiconductor memory (Flash, SSD, and the like), or may be a magnetic or optical device or drive, or a combination of such technologies.

CPU 205, RAM 210, and non-volatile memory 215 may be connected together by processor bus 250. User interface 220, camera interface 230, pitch and roll angle sensors 235, and sensor interface 240 may be connected to CPU 205 over peripheral bus 255. Graphics processor 225 may be connected to CPU 205 through graphics bus 260. CPU 205 may include one or more general purpose processing elements (cores), but may also include special purpose processing elements, such as signal or image processing circuits. Graphics processor 225 and user interface 220 may be electrically connected to interactive display monitor 135 (FIG. 1). Camera interface 230 may be electrically connected to side view cameras 120a and 120b, front view camera 125, and rear view camera 130. Sensor interface 240 may be electrically connected to steering angle sensor 117 and wheel rotation sensors 112a-112d.

Figure 3A:
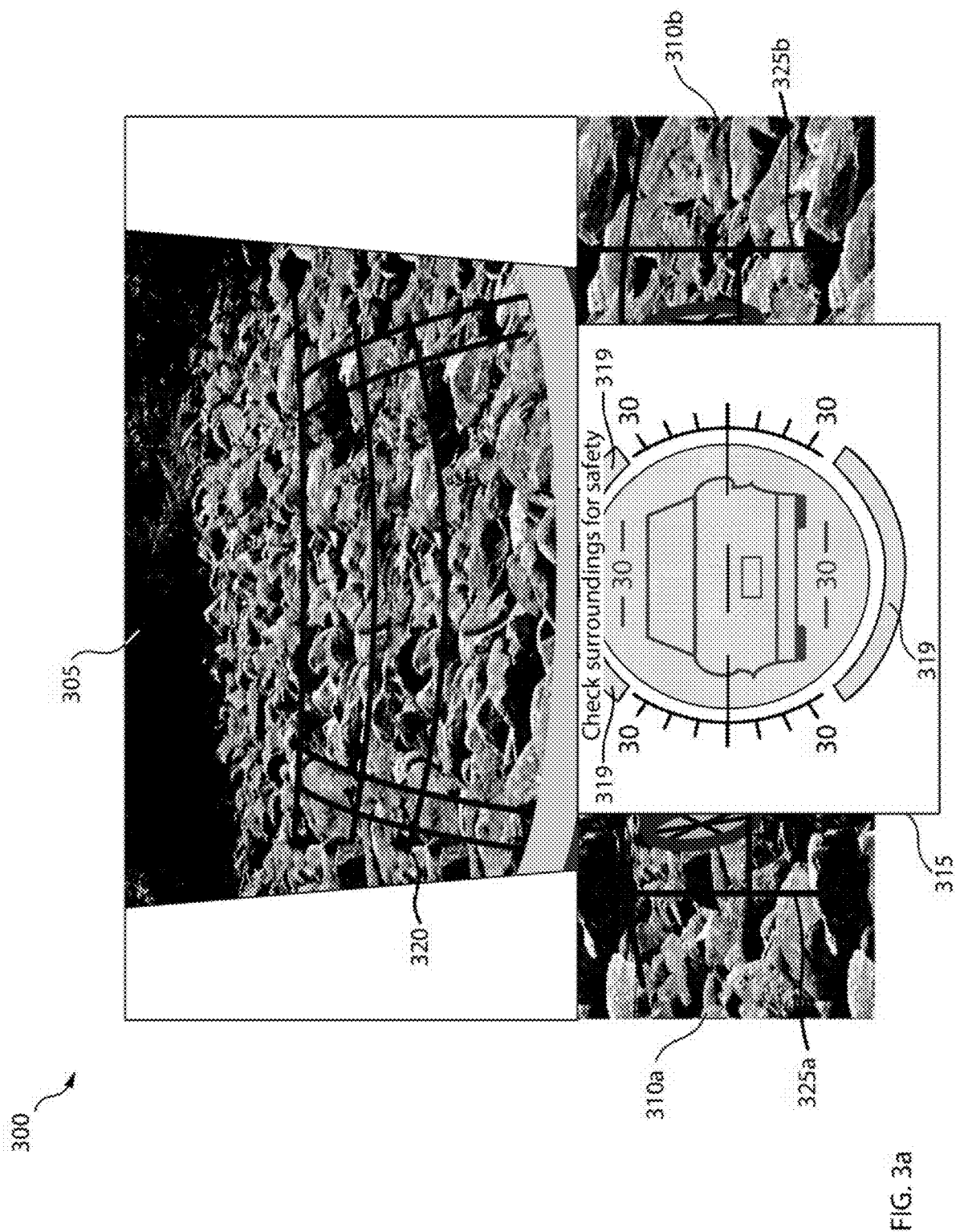
FIG. 3a is an example of a display image of a driver assist system showing front view, partial side views and meter.

FIG. 3a is an example of a display image 300 (displayed on interactive display monitor 135 in FIG. 1) of the driver assist system that includes multiple panes, where each pane contains a different view or information display (textual information, meters, gauges, and the like). Display image 300 includes panes that show front view 305, partial side views 310a, 310b, and meter 315. Front view 305 may show a live view of the area in front of the vehicle. Guidelines 320 that may show a projected path of the vehicle's tires may be superimposed on the display to assist the driver. The projected path of the vehicle's tires may be computed using information collected by wheel rotation sensors 112a-112d (along with the known tire outer circumference) and steering angle sensor 117. Partial side views 310a and 310b may show partial views around each of the front wheels of the vehicle. Safe distance lines 325a and 325b that may show a computed safe distance from the vehicle body or bumpers (to help the driver avoid obstacles near the vehicle), may be superimposed on the display. Safe distance lines 325a and 325b may also be shown in a different (contrasting) color, or may be displayed by superimposing an extension of the sides of the vehicle, that may allow a driver to see how closely they have moved the vehicle to or from an obstacle. Meter 315 may be configured to show a number of vehicle parameters, including, for example, pitch, yaw, and roll and/or display limits 318. The limits 318 being a limit to which the vehicle should be bound regarding pitch, yaw, roll, and the like.

FIG. 3b is an example of a display image 350 (displayed on interactive display monitor 135 in FIG. 1) of the driver assist system. Display image 350 includes panes that show front view 305, full side views 310a, 310b, and meter 315. As with the display image shown in FIG. 3a, front view 305 may show a live view of the area in front of the vehicle, guidelines 320 which may show a projected path of the vehicle's tires may be superimposed on the display to assist the driver. Full side views 310a and 310b may show full views around each of the front wheels of the vehicle as well as along the side of the vehicle. Safe distance lines 325a and 325b may be superimposed on the display. Meter 315 may be configured to show a number of vehicle parameters, including, for example, pitch and roll.

While the information provided in the example shown in FIGS. 3a and 3b may be helpful to the driver of the vehicle, the driver may not be aware of potential hazards from the terrain immediately below the vehicle. For example, large rocks, depressions, and wet/slippery surfaces may, under some circumstances, cause an unsafe situation that may damage or disable the vehicle. The inventors of the instant disclosure have discovered that, when a motor vehicle is moving, image sequences (or video sequences) from perimeter view cameras (front view camera 125, side view cameras 120a and 120b, and rear view camera 130, for example) may be stored in a memory to enable the driver assist system to construct a view of the ground and terrain immediately below the vehicle (referred to herein as an "under view") which is not normally captured live by any of the perimeter view cameras. In addition, superimposing tire and body positions (for example, a partially or fully transparent vehicle body) on an image of the ground and terrain below a vehicle may provide the driver with detailed knowledge of the vehicle's surroundings that may not be visible from Side the vehicle. Displaying information related to wheel position, wheel slippage, projected wheel path, vehicle pitch and roll, and vehicle location may provide the knowledge to maneuver a vehicle that would otherwise require spotters outside of the vehicle.

Figure 8C:
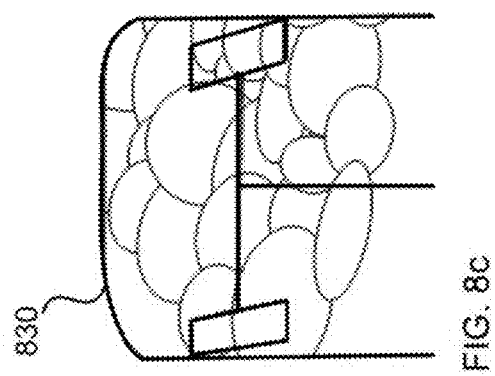
FIGS. 8a, 8b, and 8c are plan view diagrams illustrating an example of how images from perimeter view cameras may be used to construct a view of the ground and terrain below a vehicle.
Figure 8B:
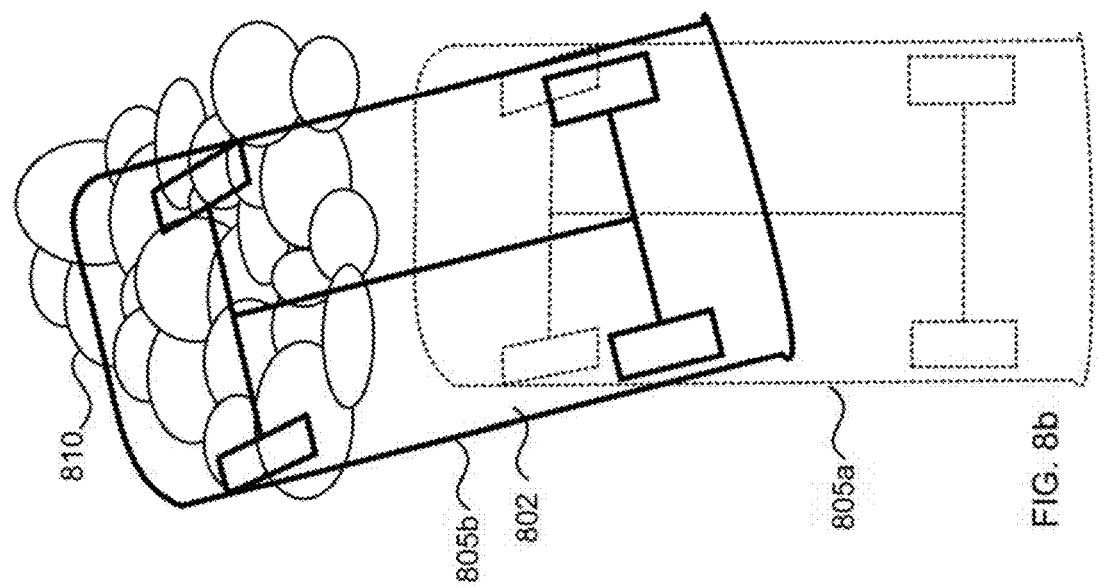
Figure 8A:
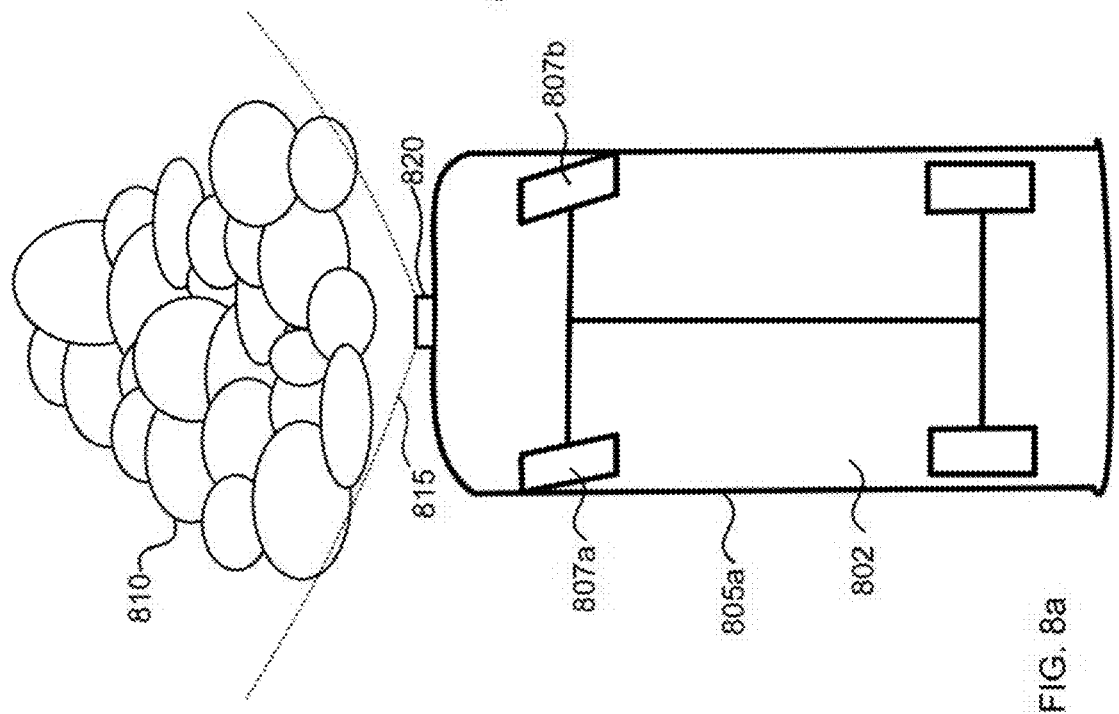

FIGS. 8a, 8b, and 8c are plan view diagrams illustrating an example of how images from perimeter view cameras may be used to construct a view of the ground and terrain below a vehicle. In FIG. 8a, vehicle 802 is in an initial position 805a at time $t_0$, travelling forward and turning slightly to the left, as indicated by the orientation of front wheels 807a and 807b. Terrain features 810 may be captured and stored as a sequence of images (or video sequence) by front view camera 820 with a field of view within cone 815.

Referring now to FIG. 8b, vehicle 802 has moved from its initial position 805a (indicated as a dotted line) to new (displaced) position 805b at time $t_1$. Based on the distance and direction travelled between positions 805a and 805b (using, for example, information from wheel rotation sensors 112a-112d and steering angle sensor 117), driver assist system may compute the precise location of the vehicle with respect to the image of terrain features 810 captured by front view camera 820 continuously from time $t_0$ to $t_1$. An under view may be constructed by appropriate translation, rotation, and cropping of a previously captured image. Other transformations or additional image transforms may be used to adjust the previously captured image to construct a more accurate rendition of the ground and terrain below the vehicle. By using additional images from other perimeter view cameras (side view and rear view cameras, for example), an under view may be computed for any direction and speed of the moving vehicle. FIG. 8c shows a cropped and rotated view of the front of the vehicle with the constructed under view illustrated under the vehicle outline 830.

Figure 9:
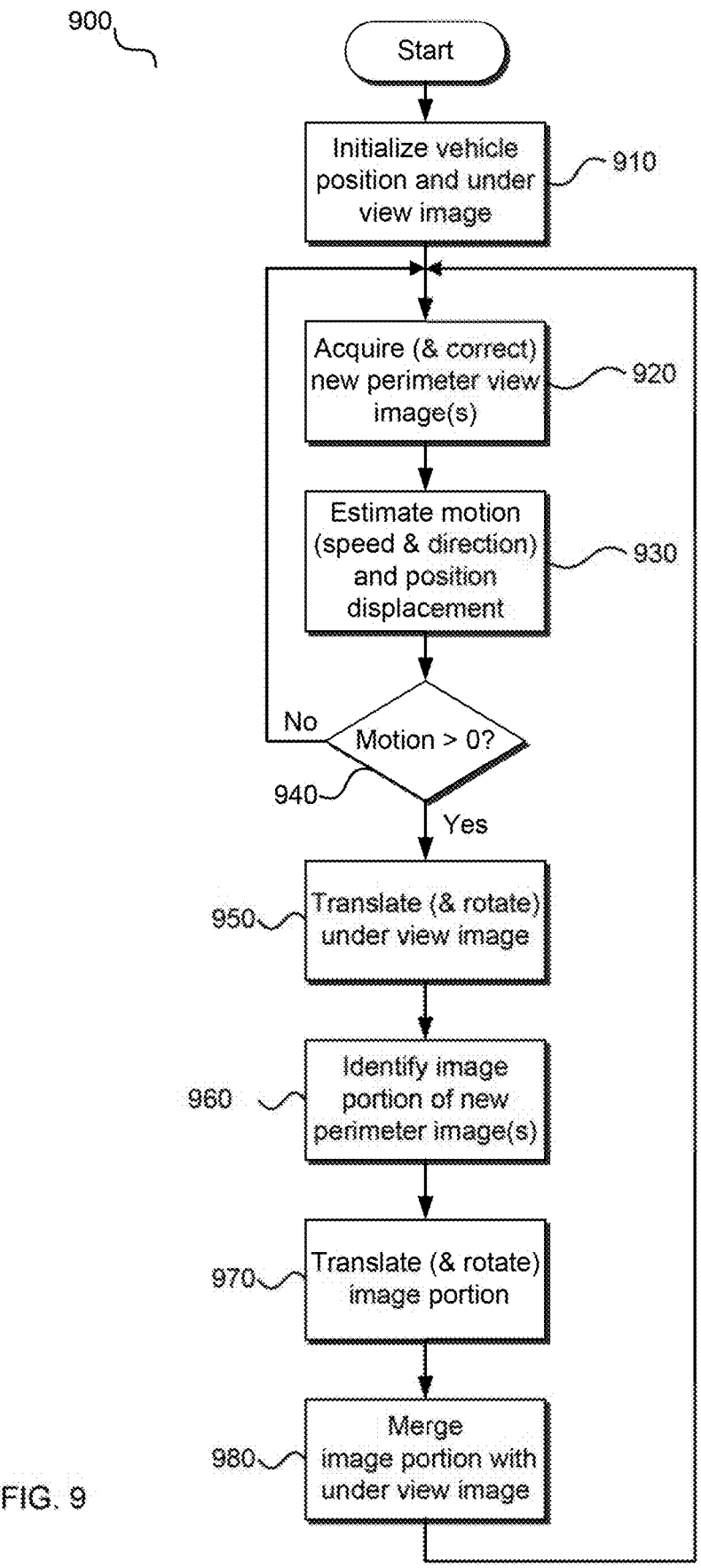
FIG. 9 illustrates a flow diagram of an incremental image update process.

The processing of previously captured images to construct an image of the ground and terrain under the vehicle may also be done as an incremental update process to ensure that only the most recent perimeter views are used at each time instant. A flow diagram of an example incremental image update process is illustrated in FIG. 9.

Image update process 900, which may be performed by processing circuitry 200, begins with initialization step 910, where the initial position of the vehicle is set and the under view image is initialized (simple flat gray field, for example). The following steps (920 through 980) may be executed repetitively (thirty times per second, for example).

In step 920, image update process 900 may acquire new perimeter view images from one or more perimeter view cameras. The acquired images may be corrected for lens distortion (for wide-angle or fish-eye lens) using methods known in the art.

In step 930, image update process 900 may estimate the motion (speed and direction) and position displacement of the vehicle. This process may use a steering angle from steering angle sensor 117 (FIG. 1) and wheel angular velocity as measured by wheel rotation sensors 112a-112d (FIG. 1), along with a known tire outer circumference. Step 930 may also use other methods known in the art for estimating the motion and position displacement of the vehicle (for example, GPS, Assisted GPS, Differential GPS, cellular network signals, etc.).

In step 940, image update process 900 may determine if the vehicle is in motion. If the vehicle is not in motion, the process may return to step 920, If the vehicle is in motion, the process may continue to step 950. Alternatively, step 940 could be omitted in an additional (non-illustrated) embodiment, and the process 900 continues from step 930 to step 950.

In step 950, image update process 900 may translate (and rotate, if necessary) the current under view image to correspond to the position displacement of the vehicle. This translation and rotation may leave an area at the edge of the under view image with no data.

In step 960, image update process 900 may use the motion and position displacement of the vehicle to identify an image portion from the previous images captured by the one or more perimeter view cameras.

In step 970, the identified image portion may be translated (and rotated if necessary) to match the area at the edge of the under view image that was left with no data in step 950.

In step 980, the image portion may then be merged with the under view image to form a new under view image.

In step 990, the under view image may be displayed (in one or more panes on interactive display monitor 135 in FIG. 1, for example).

The process may then return to step 920 to await the next acquisition of perimeter view images and the process may repeat.

By using previously captured images from perimeter view cameras to construct a view of the ground and terrain below a vehicle, there is no need to have a camera on the bottom of the vehicle. Cameras under a vehicle would typically lack sufficient lighting, and would be subject to dirt or damage from rough terrain, mud, and/or grime below the vehicle.

Figure 4A:
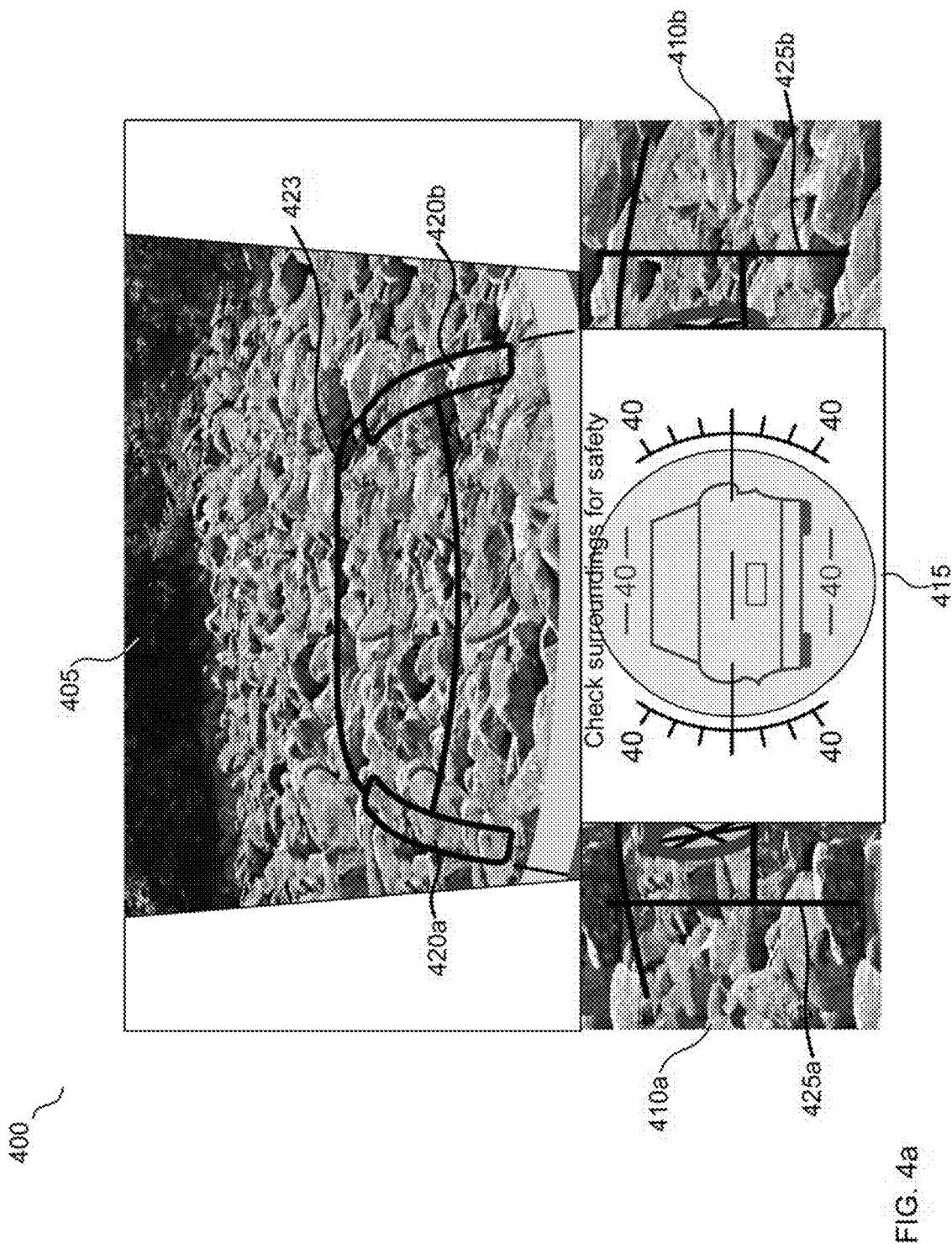
FIG. 4a is yet another example of a display image of a driver assist system showing front view, partial under view, partial side views and meter.
Figure 4B:
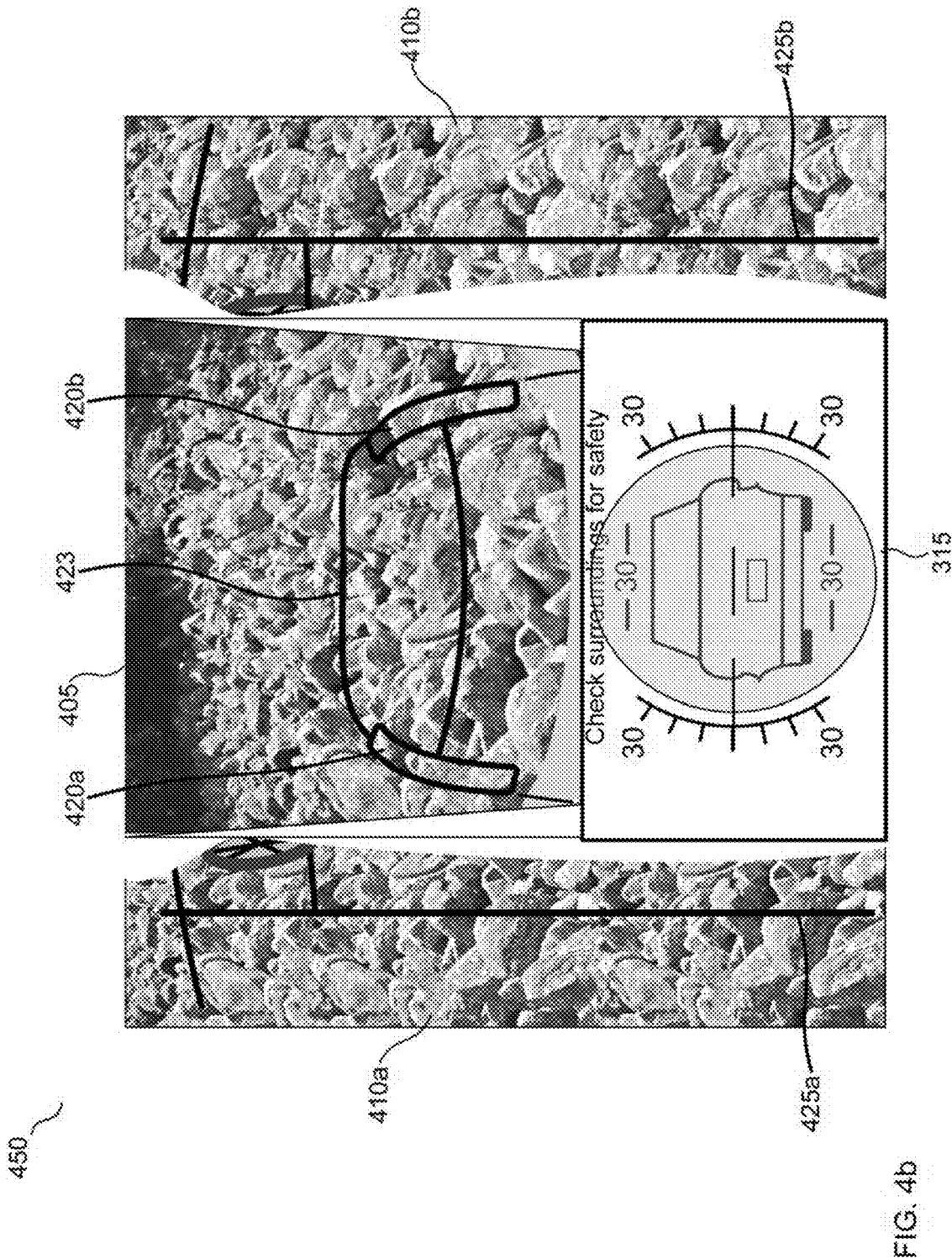
FIG. 4b is yet another example of a display image of a driver assist system showing front view, partial under view, full side views and meter.

FIG. 4a is an example of a display image 400 (displayed on interactive display monitor 135 in FIG. 1) of the driver assist system. Display image 400 may show front view 405, partial side views 410a, 410b, and meter 415. Front view 405 may show a view of the area in front of and under the front portion of the vehicle. Guidelines 420a and 420b, which may show the positions of the vehicle's front tires, and guideline 423, that may show the position of the front of the vehicle, may be superimposed on the display to assist the driver. As described in detail above, the view of the terrain under the front of the vehicle may be computed using stored images from one or more perimeter view cameras and information collected by wheel rotation sensors 112a-112d and steering angle sensor 117. Partial side views 410a and 410b show partial views around each of the front wheels. Safe distance lines 425a and 425b that may show a computed safe distance from the vehicle body or bumpers (to help the driver avoid obstacles near the vehicle), may be superimposed on the display. Meter 415 may be configured to show a number of vehicle parameters, including pitch and roll. 100471 FIG. 4b is an example of a display image 450 (displayed on interactive display monitor 135 in FIG. 1) of the driver assist system showing front view 405, full side views 410a, 410b, and meter 415. As with the display image shown in FIG. 4a, front view 405 shows a view of the area in front of and under the front portion of the vehicle. Guidelines 420a and 420b, and guideline 423, may be superimposed on the display to assist the driver. Safe distance lines 425a and 425b may be superimposed on the display. Meter 415 may be configured to show a number of vehicle parameters, including pitch and roll.

FIG. 5 is an example of a display image 500 (displayed on interactive display monitor 135 in FIG. 1) of the driver assist system showing front view 505, and partial under view 510. Front view 505 shows a view of the area in front of and under the front portion of the vehicle. Guidelines 520a and 520b, which may show the positions of the vehicle's front tires and a projected path of the vehicle (based on information collected by wheel rotation sensors 112a-112d and steering angle sensor 117), and guideline 525, which may show the position of the front of the vehicle, may be superimposed on front view 505 to assist the driver. Partial under view 510 may show additional ground and terrain features under the vehicle. Guidelines 515a and 515b, which may show the position and orientation of the vehicle's front tires, and guideline 530, which may show the outline of the front of the vehicle, may be superimposed on partial under view 510 to further assist the driver. Again, the view of the ground and terrain under the front of the vehicle may be computed using stored images from one or more perimeter view cameras and information collected by wheel rotation sensors 112a-112d and steering angle sensor 117.

Figure 6:
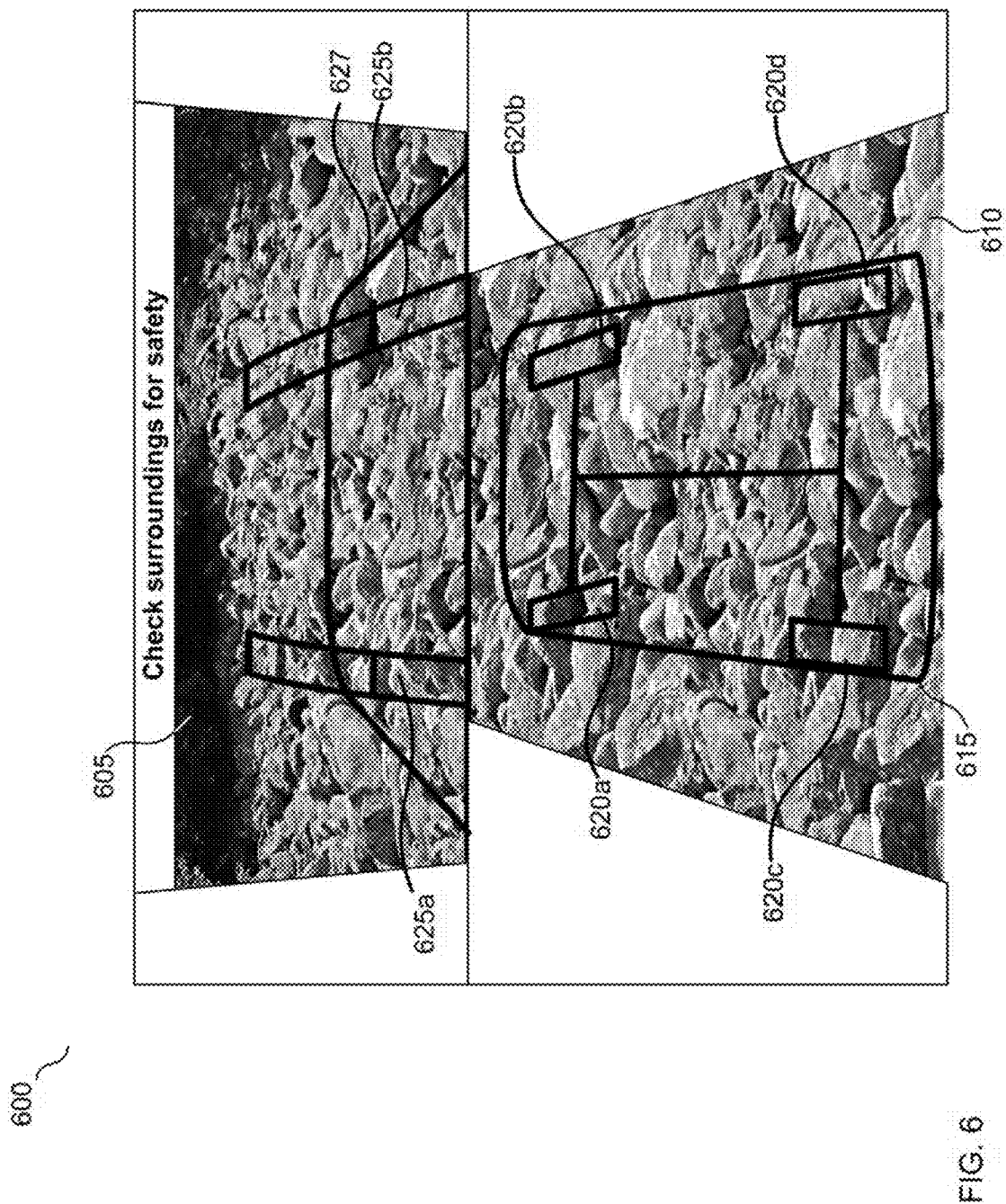
FIG. 6 is yet another example of a display image of a driver assist system showing front view and full under view.

FIG. 6 is an example of a display image 600 (displayed on interactive display monitor 135 in FIG. 1) of the driver assist system. Display image 600 shows front view 605, and full under view 610. Front view 605 may show a view of the area in front of and under the front portion of the vehicle. Guidelines 625a and 625b, which may show the positions of the vehicle's front tires and a projected path of the vehicle (based on information collected by wheel rotation sensors 112a-112d and steering angle sensor 117), and guideline 627, which may show the position of the front of the vehicle, may be superimposed on front view 605 to assist the driver. Full under view 610 may show the ground and terrain features under the entire vehicle. Guidelines 620a-620d, which may show the position and orientation of the vehicle's four tires, and guideline 615, which may show the outline of the vehicle, may be superimposed on full under view 610 to further assist the driver. Again, the view of the ground and terrain under the vehicle may be computed using stored images from one or more perimeter view cameras and information collected by wheel rotation sensors 112a-112d and steering angle sensor 117.

Figure 7:
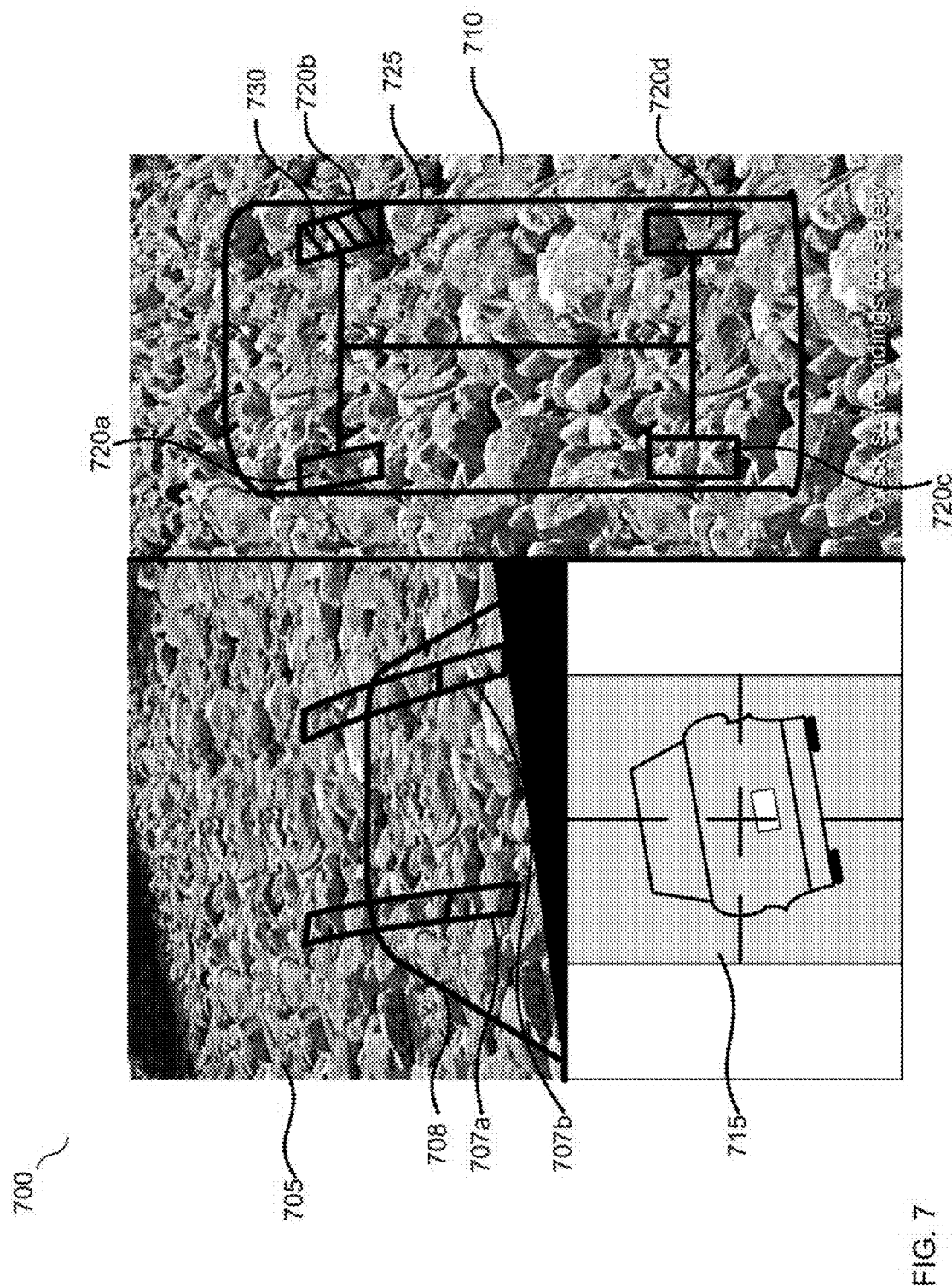
FIG. 7 is yet another example of a display image of a driver assist system showing front view with partial under view, full under view, and meter.

FIG. 7 is an example of a display image 700 (displayed on interactive display monitor 135 in FIG. 1) of the driver assist system. Display image 700 may show front view with partial under view 705, full under view 710, and meter 715. Front view with partial under view 705 may show a view of the area in front of and under the front portion of the vehicle. Guidelines 707a and 707b, which may show the positions of the vehicle's front tires and a projected path of the vehicle (based on information collected by wheel rotation sensors 112a-112d and steering angle sensor 117), and guideline 708, which may show the position of the front of the vehicle, may be superimposed on front view with partial under view 705 to assist the driver. Full under view 710 shows the ground and terrain features under the entire vehicle. Guidelines 720a-720d, which may show the position and orientation of the vehicle's four tires, and guideline 725, which may show the outline of the vehicle, may be superimposed on full under view 710 to further assist the driver. Again, the view of the ground and terrain under the vehicle may be computed using stored images from one or more perimeter view cameras and information collected by wheel rotation sensors 112a-112d and steering angle sensor 117. Meter 715 may be configured to show a number of vehicle parameters, including pitch and roll. FIG. 7 also may indicate wheel slippage as, for example, hash marks 730. Other methods of indicating wheel slippage (color highlighting, text, and the like) may also be used. Additionally, FIG. 7 illustrates how an image (front view image 705, for example) may be tilted or rotated in accordance with information such as vehicle roll angle. This image adjustment may provide the driver additional awareness of possible unevenness of the terrain around the vehicle. Again, these functions may provide the driver with information that is not typically available without another person outside of the vehicle.

Figure 10:
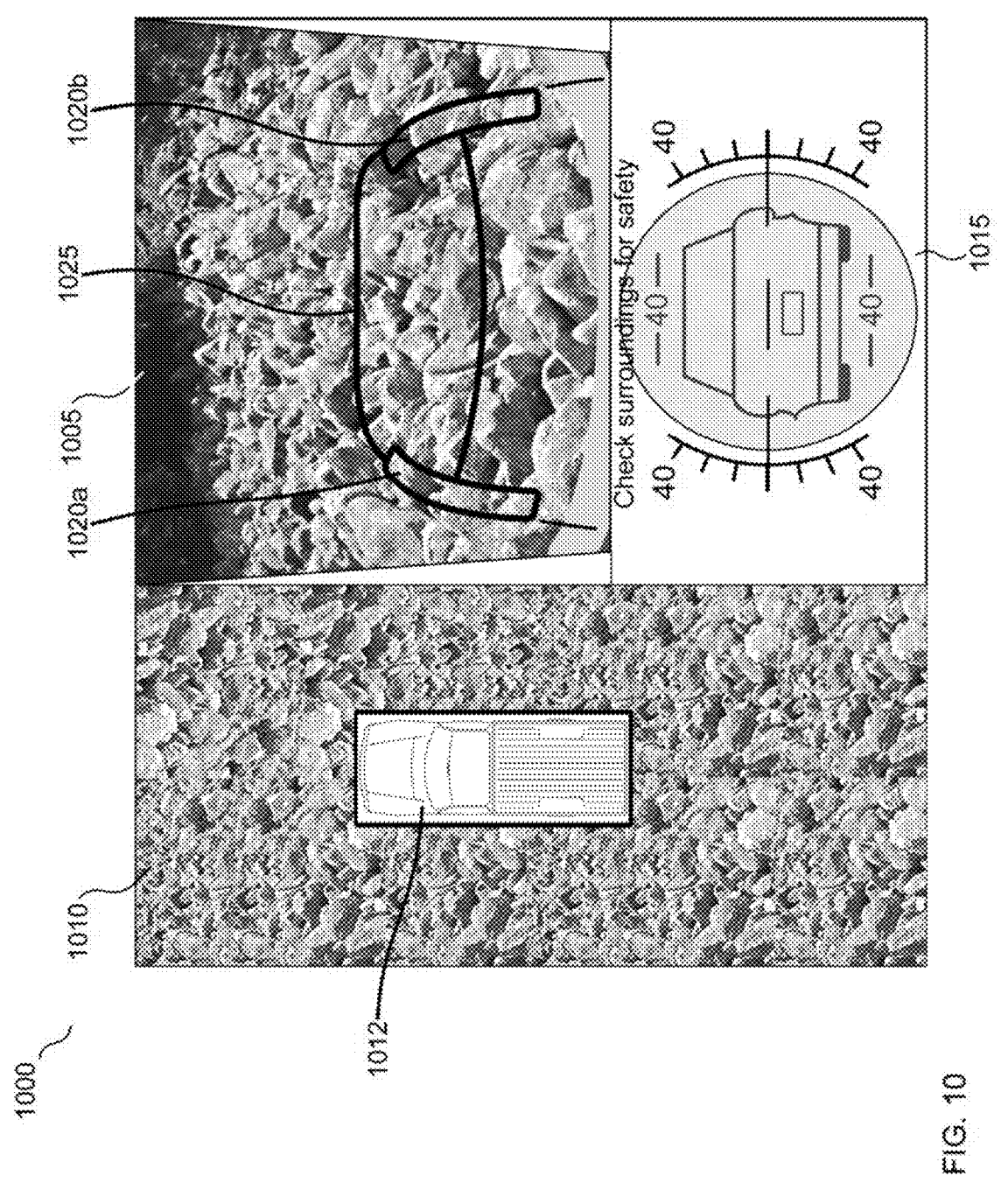

FIG. 10 is an example of yet another display image 1000 (displayed on interactive display monitor 135 in FIG. 1) of the driver assist system. Display image 1000 may show front view 1005, 360° view 1010, and meter 1015. Front view 1005 may show a view of the area in front of and under the front portion of the vehicle. Guidelines 1020a and 1020b, which may show the positions of the vehicle's front tires, and guideline 1025, which may show the position of the front of the vehicle, may be superimposed on the display to assist the driver. As described in detail above, the view of the terrain under the front of the vehicle may be computed using stored images from one or more perimeter view cameras and information collected by wheel rotation sensors 112a-112d and steering angle sensor 117. 360° view 1010 may show a view apparently from above the vehicle 1012, where the area view around vehicle 1012 may be provided by processing the images from perimeter view cameras to create an image mosaic as discussed above. Meter 1015 may be configured to show a number of vehicle parameters, including pitch and roll.

Figure 11:
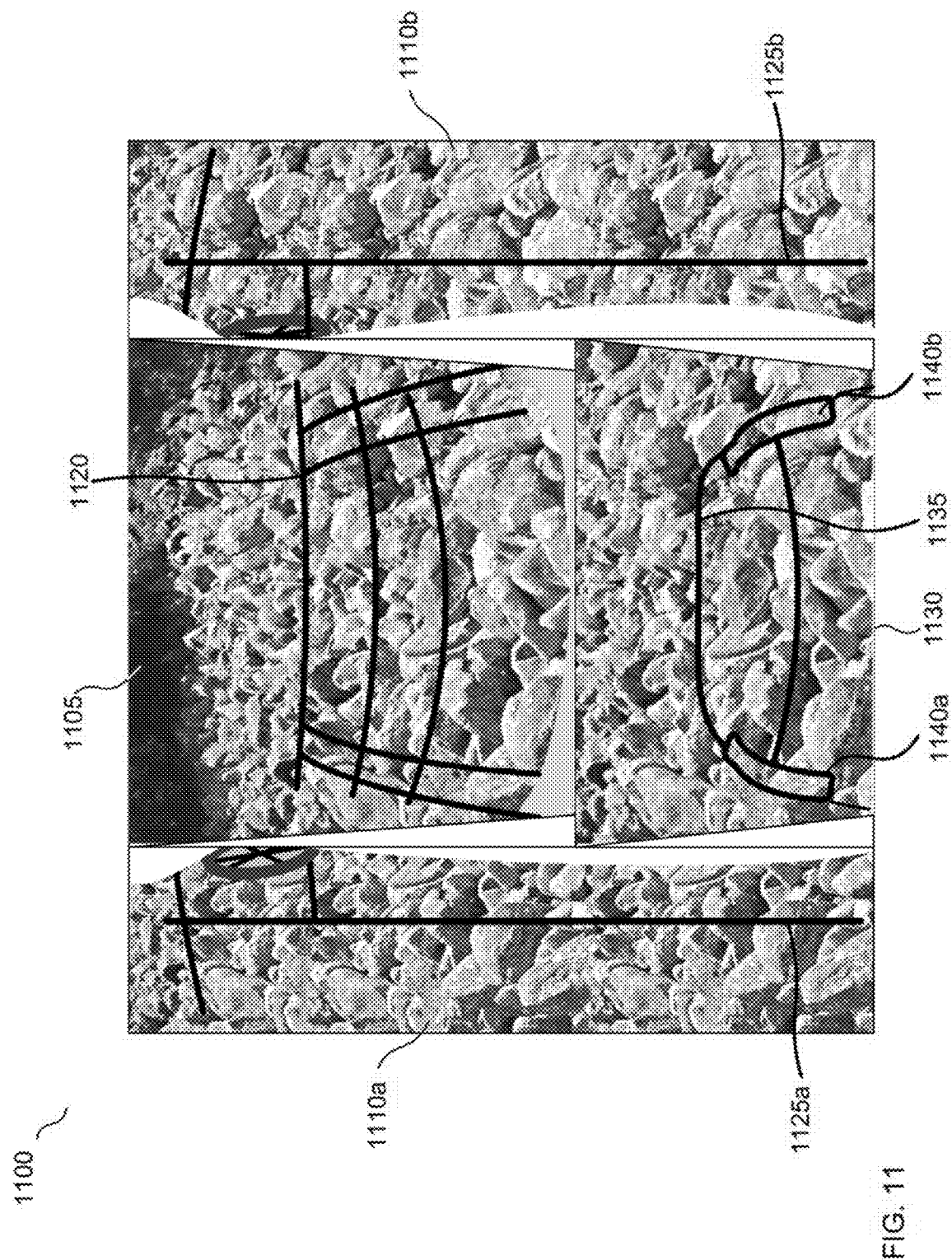
FIG. 11 illustrates an additional example of a display image of a driver assist system showing front view, front view with partial under view, and full side views.

FIG. 11 is an example of another display image 1150 (displayed on interactive display monitor 135 in FIG. 1) of the driver assist system. Display image 1150 may show front view 1105, full side views 1110a, 1110b, and front view with partial under view 1130. As with the display images previously shown, front view with partial under view 1130 shows a view of the area in front of and under the front portion of the vehicle. As described previously, guidelines 1120, 1135, 1140a, and 1140b, may be superimposed on the display to assist the driver. Safe distance lines 1125a and 1125b may also be superimposed on the display.

Figure 12:
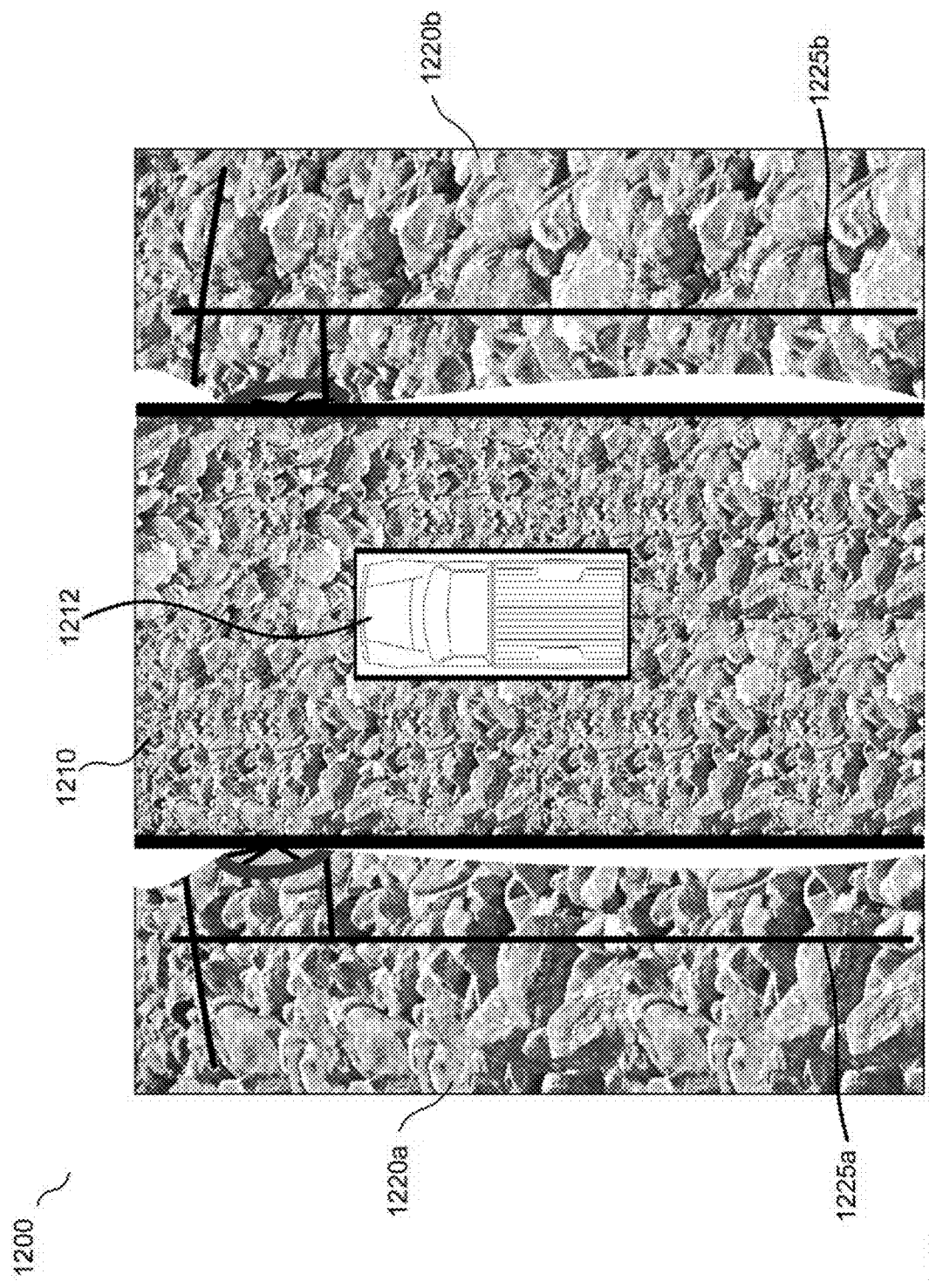
FIG. 12 illustrates an additional example of a display image of a driver assist system showing a 360° perimeter view, and full side views.

FIG. 12 is an example of yet another display image 1250 (displayed on interactive display monitor 135 in FIG. 1) of the driver assist system. Display image 1250 may show 360° view 1210 and full side views 1220a and 1220b. 360° view 1210 may show a view apparently from above the vehicle 1212 along with the area around vehicle 1012. Safe distance lines 1225a and 1225b may also be superimposed on the display.

The views shown in display images of FIGS. 3-12 exhibit just a small number of options available with the driver assist system as disclosed herein. A large number of combinations of views may provide the driver with the ability to customize the system's views to the needs of different situations. For example, when parking in a tight space, wheel slippage information may not be needed to make vehicle maneuvering decisions. When driving in an off-road situation, however, wheel slippage information may be more important. By having the ability to focus the system's display on certain parts of the terrain or certain characteristics of the vehicle, the user can adapt the system to changing terrain and situations. Additionally, the driver assist system may adjust the viewing angle for the camera images in accordance with the vehicle's angle, pitch, and, roll to present a more complete depiction of the vehicle situation. Also, the driver assist system may create additional guidelines conveying information such as but not limited to side boundaries of vehicle, distances of objects from the vehicle, etc.

Obviously, numerous modifications and variations of the present disclosure are possible in light of the above teachings. It is therefore to be understood that within the scope of the appended claims, the concepts disclosed may be practiced otherwise than as specifically described herein.

The invention claimed is:

1. A driver assist system for a motor vehicle comprising:
   processing circuitry;
   one or more perimeter view cameras connected to the processing circuitry;
   a position displacement sensor connected to the processing circuitry; and
   a display monitor connected to the processing circuitry, wherein the processing circuitry is configured to:
   receive and store a sequence of images from each of the one or more perimeter view cameras;
   estimate a position displacement of the motor vehicle based on an output of the position displacement sensor;
   select at least a portion of a previously stored image from the sequence of images from each of the one or more perimeter view cameras based on the estimated position displacement of the motor vehicle to construct an under view image of an under view of at least a portion of the motor vehicle;
   display the under view image in a first pane on the display monitor;
   estimate a position and orientation of one or more wheels of the motor vehicle in the under view based on an output of the position displacement sensor;
   display guidelines indicating the estimated position and orientation of the one or more wheels of the motor vehicle in the under view on the display monitor as an overlay on the under view image;
   translate the under view image based on an output of the position displacement sensor;
   identify an image portion from another previously stored image from the sequence of images that corresponds to an area of the translated under view image with no data;
   translate the image portion to match the area;
   merge the image portion with the translated under view image to form a new under view image;
   display the new under view image in the first pane of the display monitor;
   display a first instance of the under view image with the guidelines indicating the estimated position and orientation of the one or more wheels of the motor vehicle in the under view overlaid thereon in the first pane on the display monitor; and
   display a second instance of the under view image with the guidelines indicating the estimated position and orientation of the one or more wheels of the motor vehicle in the under view overlaid thereon in a second pane different from the first plane on the display monitor.

2. The driver assist system of claim 1, wherein the position displacement sensor includes:
   a steering angle sensor; and
   one or more angular velocity sensors, wherein each of the one or more angular velocity sensors measures an angular velocity of a wheel of the motor vehicle.

3. The driver assist system of claim 1, wherein the position displacement sensor includes:
   one or more of GPS, Assisted GPS, Differential GPS, cellular network signals, ultrasonic sensors, optical or electro-magnetic sensors, and an analysis of perimeter view camera images.

4. The driver assist system of claim 1, wherein the processing circuitry is further configured to:
   display one or more live images from the one or more perimeter view cameras in one or more additional panes on the display monitor.

5. The driver assist system of claim 4, wherein the processing circuit is further configured to:
   estimate a projected path of the motor vehicle based on an output of the position displacement sensor; and
   display guidelines indicating the estimated projected path of the motor vehicle on the display monitor as an overlay on the one or more live images.

6. The driver assist system of claim 1, wherein the processing circuit is further configured to:
   measure a roll angle of the motor vehicle; and
   display a meter indicating the roll angle and a limitation of the roll angle of the motor vehicle on the display monitor.

7. The driver assist system of claim 1, wherein the processing circuit is further configured to:
   estimate a projected path of the motor vehicle based on an output of the position displacement sensor; and
   display guidelines indicating the estimated projected path of the motor vehicle on the display monitor as an overlay on the under view image.

8. The driver assist system of claim 1, wherein the processing circuit is further configured to:
   accept one or more inputs on the display monitor; and
   arrange one or more panes of a display image for the display monitor corresponding to the inputs on the display monitor.

9. The driver assist system of claim 1, wherein the processing circuitry is further configured to:
   estimate a projected path of the motor vehicle based on an output of the position displacement sensor; and display guidelines indicating the estimated projected path of the motor vehicle on the display monitor as an overlay on the second instant of the under view image in the second pane, wherein the guidelines indicating the estimated projected path of the motor vehicle are contiguous with the guidelines indicating the estimated position and orientation of the one or more wheels of the motor vehicle in the under view.

10. A method for assisting a driver of a motor vehicle comprising:

receiving and storing a sequence of images from one or more perimeter view cameras;

estimating a position displacement of the motor vehicle;

selecting at least a portion of a previously stored image from the sequence of images from each of the one or more perimeter view cameras based on the position displacement of the motor vehicle;

constructing an under view image of an under view of at least a portion of the motor vehicle from the selected portion of a previously stored image;

displaying the under view image in a first pane on an display monitor;

estimating a position and orientation for one or more wheels of the motor vehicle in the under view based on an output of the position displacement sensor;

displaying guidelines indicating the estimated position and orientation for the one or more wheels of the motor vehicle in the under view on the display monitor as an overlay on the under view image;

translating the under view image based on an output of the position displacement sensor;

identifying an image portion from another previously stored image from the sequence of images that corresponds to an area of the translated under view image with no data;

translating the image portion to match the area;

merging the image portion with the translated under view image to form a new under view image;

displaying the new under view image in the first pane of the display monitor;

displaying a first instance of the under view image with the guidelines indicating the estimated position and orientation of the one or more wheels of the motor vehicle in the under view overlaid thereon in the first pane on the display monitor; and displaying a second instance of the under view image with the guidelines indicating the estimated position and orientation of the one or more wheels of the motor vehicle in the under view overlaid thereon in a second pane different from the first plane on the display monitor.

11. The method of claim 10, further comprising:
displaying one or more live images from the one or more perimeter view cameras in one or more additional panes on the display monitor.

12. The method of claim 11, further comprising:
estimating a projected path of the motor vehicle; and
displaying guidelines indicating the estimated projected path of the motor vehicle on the display monitor as an overlay on the one or more live images.

13. The method of claim 10, further comprising:
measuring a roll angle of the motor vehicle; and
displaying a meter indicating the roll angle of the motor vehicle in a second pane on the display monitor.

14. The method of claim 10, further comprising:
estimating a projected path of the motor vehicle; and
displaying guidelines indicating the estimated projected path of the motor vehicle on the display monitor as an overlay on the under view image.

15. The method of claim 10, further comprising:
accepting one or more inputs on the display monitor; and
arranging one or more panes of a display image for the display monitor corresponding to the inputs on the display monitor.

16. A non-transitory computer-readable medium storing computer-readable instructions thereon which when executed by a computer cause the computer to perform a method comprising:

receiving and storing a sequence of images from one or more perimeter view cameras;

estimating a position displacement of the motor vehicle;

selecting at least a portion of a previously stored image from the sequence of images from each of the one or more perimeter view cameras based on the position displacement of the motor vehicle;

constructing an under view image of an under view of at least a portion of the motor vehicle from the selected portion of a previously stored image;

displaying the under view image in a first pane on an display monitor;

estimating a position and orientation for one or more wheels of the motor vehicle in the under view based on an output of the position displacement sensor;

displaying guidelines indicating the estimated position and orientation for the one or more wheels of the motor vehicle in the under view on the display monitor as an overlay on the under view image;

translating the under view image based on an output of the position displacement sensor;

identifying an image portion from another previously stored image from the sequence of images that corresponds to an area of the translated under view image with no data;

translating the image portion to match the area;

merging the image portion with the translated under view image to form a new under view image;

displaying the new under view image in the first pane of the display monitor;

displaying a first instance of the under view image with the guidelines indicating the estimated position and orientation of the one or more wheels of the motor vehicle in the under view overlaid thereon in the first pane on the display monitor; and displaying a second instance of the under view image with the guidelines indicating the estimated position and orientation of the one or more wheels of the motor vehicle in the under view overlaid thereon in a second pane different from the first plane on the display monitor.

17. The non-transitory computer-readable medium according to claim 16, further comprising:
displaying one or more live images from the one or more perimeter view cameras in one or more additional panes on the display monitor.

18. The non-transitory computer-readable medium according to claim 16, further comprising:
estimating a projected path of the motor vehicle; and
displaying guidelines indicating the estimated projected path of the motor vehicle on the display monitor as an overlay on the under view image.

* * * * *